United States Patent [19]
Hidaka et al.

[11] Patent Number: 5,933,589
[45] Date of Patent: Aug. 3, 1999

[54] APPARATUS AND METHOD OF MAKING PRINT ACCORDING TO FIXED FORMAT

[75] Inventors: Norihiro Hidaka, Ome; Hiroki Kim, Akishima, both of Japan

[73] Assignee: Casio Computer Co., Ltd., Tokyo, Japan

[21] Appl. No.: 08/841,112

[22] Filed: Apr. 29, 1997

Related U.S. Application Data

[62] Division of application No. 08/346,478, Nov. 29, 1994, Pat. No. 5,677,999.

[30] Foreign Application Priority Data

Dec. 2, 1993 [JP] Japan .................................. 5-329557

[51] Int. Cl.⁶ .................................................. G06H 15/00
[52] U.S. Cl. ............................................ 395/117; 395/112
[58] Field of Search .................................... 395/117, 101, 395/112, 102, 110; 705/416; 345/348, 352, 353, 326; 400/103, 104; 707/505, 514, 516, 522

[56] References Cited

U.S. PATENT DOCUMENTS

| | | | |
|---|---|---|---|
| 4,635,212 | 1/1987 | Hatazawa | ................. 395/102 |
| 4,936,693 | 6/1990 | Ohsawa | ................. 400/104 |
| 4,996,539 | 2/1991 | Haraga et al. . | |
| 5,208,902 | 5/1993 | Kumon | ................. 395/116 |
| 5,425,138 | 6/1995 | Kumakawa | ................. 395/146 |
| 5,684,070 | 11/1997 | Asuma et al. | ................. 345/348 |

FOREIGN PATENT DOCUMENTS

0297568 A2  1/1989  European Pat. Off. .

*Primary Examiner*—Arthur G. Evans
*Attorney, Agent, or Firm*—Frishauf, Holtz, Goodman, Langer & Chick

[57] ABSTRACT

Plural types of fixed format data for printing on a label tape are previously stored in a ROM in a label printer. The label printer displays a menu for selecting a fixed format on a display section. A user operates a key input section to select a fixed format and then input character data. The input character data is printed on a label tape in accordance with a format based on selected fixed format data. Therefore, the printing apparatus can easily input data and prepare elaborate label tapes.

10 Claims, 20 Drawing Sheets

FIG.5A PLEASE SELECT OBJECT WHERE LABEL TAPE IS STUCK
K → • VIDEO CASSETTE
• COMPACT CASSETTE
• FLOPPY DISK
— 15

FIG.5B PLEASE SELECT WIDTH OF LABEL TAPE
K → • VHS
• VHS-C
• 8-mm TAPE
— 15

FIG.5C PLEASE SELECT VERTICAL OR HORIZONTAL WRITING
• VERTICAL
• HORIZONTAL
— 15

FIG.5D 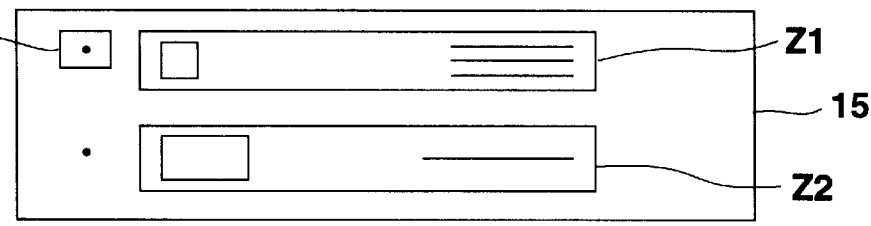
K, Z1, 15, Z2

FIG.5E PLEASE INPUT CLASSIFICATION NAME
IN 8 CHARACTERS OR LESS HARD ACT
— 15

FIG.5F PLEASE ENTER A TITLE IN X × OR LESS CHARACTERS
STAGECOACH
— 15

FIG.5G PLEASE INPUT NOTE DATA
93.3. TV ON AIR
:
:
— 15

SELECTION ITEMS FOR FIXED FORMAT

| USAGE | DETAILED USAGE | CONTENTS | DETAILED CONTENTS | PRINTABLE LABEL | DEFAULT |
|---|---|---|---|---|---|
| VIDEO | VHS<br>8mm<br>BETA | MOVIE | TITLE<br>STAR<br>CAST1<br>CAST2<br>COUNTRY | VHS·β<br>24,18,<br>12.9mm<br><br>8mm<br>12.9mm | VERTICAL |
| | | DRAMA<br>MUSIC<br>COMEDY | TITLE<br>RECORDED DATE<br>RECORDING TIME<br>CAST1<br>CAST2 | | |
| | | SPORT | TITLE<br>RECORDED DATE<br>RECORDING TIME<br>CHANNEL<br>CAST | | |
| | | RECORDING | TITLE<br>RECORDED DATE<br>RECORDING TIME<br>PLACE<br>RECORDER | | |
| AUDIO | CASSETTE<br>DAT<br>MD | MUSIC | TITLE<br>COMPOSER<br>PLAYER<br>CAST1<br>CAST2 | 12.9mm | HORI-<br>ZONTAL |
| | | RECORDING | TITLE<br>RECORDED DATE<br>RECORDING TIME<br>PLACE<br>CAST | | |
| SPINE | LARGE<br>SMALL | | TITLE<br>COMMENT1<br>COMMENT2<br>COMMENT3<br>COMMENT4 | 24,18,<br>12.9mm | VERTICAL |
| FLOPPY | 3.5inch<br>5.0inch | | TITLE<br>COMMENT1<br>COMMENT2 | 24,18,<br>12.9mm | HORI-<br>ZONTAL |
| NAME | NAME PLATE | CHILD | SCHOOL NAME<br>GRADE/CLASS<br>NAME | 24,18,<br>12.9mm | VERTICAL |
| | | STUDENT | SCHOOL NAME<br>GRADE/CLASS<br>NAME | | |
| | | ORDINARY | GROUP NAME<br>SECTION<br>NAME | | |
| | ADDRESS | DESTI-<br>NATION | ZIP CODE<br>ADDRESS<br>NAME | 24,18,<br>12.9mm | VERTICAL |
| | | ADDRESS | ZIP CODE<br>ADDRESS<br>NAME<br>TELEPHONE NO. | | |
| GENERAL USE | PROPERTY MANAGEMENT | | FURNISHING NAME<br>MANAGING SECTION<br>PROPERTY NO.<br>COMPANY NAME | 24,18,<br>12.9mm | HORI-<br>ZONTAL |
| | GENERAL USE | GENERAL1<br>GENERAL2<br>GENERAL3 | TITLE<br>COMMENT1<br>COMMENT2 | 24,18,<br>12.9mm | HORI-<br>ZONTAL |

FIG.7

FIXED FORMAT SELECTION TABLE 103

| TAPE WIDTH (mm) | SELECTABLE OR NOT | | | | MANAGEMENT |
|---|---|---|---|---|---|
| | VIDEO | AUDIO | SPINE | FLOPPY | |
| 24mm | VHS BETA | UNSELEC-TABLE | LARGE SMALL | 3.5 5 | A B |
| 18mm | VHS BETA | UNSELEC-TABLE | LARGE SMALL | 3.5 5 | A B |
| 12mm | VHS BETA 8mm | CASSETTE DAT MD | LARGE SMALL | 3.5 5 | C D |
| 9mm | VHS BETA 8mm | CASSETTE DAT MD | LARGE SMALL | 3.5 5 | C D |

FIG.8A

MENU ROM 31

| ITEM / USAGE | FULL IMAGE OF FORMAT | TAPE LENGTH | TAPE WIDTH |
|---|---|---|---|
| VIDEO | | TAPE LENGTH 14.8mm | TAPE WIDTH 18mm |
| ⋮ | ⋮ | ⋮ | ⋮ |
| NAME | | TAPE LENGTH 7.4mm | TAPE WIDTH 18mm |
| | | | |

FIG.8B

| FRAME | PRINTABLE NO. | PRINTABLE ONLY ON 24/18mm TAPE | ALWAYS PRINTABLE ON 3-mm OR WIDER TAPE | PRINTABLE ON 6mm TAPE |
|---|---|---|---|---|
| FRAME TYPE | ORNAMENTED FRAME | NO3, 121, | NO1, 2, 4~120 | NO1, 4, |
| | ILLUSTRATION FRAME | — | NO1, 2, 4~70, 121~140 | — |
| | ONE-CHARACTER FRAME | — | 140~160 | — |
| FRAME SIZE | | 128 DOTS | 64 DOTS | 32 DOTS |

FIG.19

APPARATUS AND METHOD OF MAKING PRINT ACCORDING TO FIXED FORMAT

This is a division of application Ser. No. 08/346,478 filed Nov. 29, 1994, U.S. Pat. No. 5,677,999.

BACKGROUND OF THE INVENTION

1. Field of the Invention

The present invention relates to a printing apparatus and a printing method which can print data using a fixed format with a simple operation.

2. Description of the Related Art

There are label printers which prepare label tapes to stick on audio cassettes, video cassettes, floppy disks, name plates, furnishings, etc.

With the use of the conventional label printers, a user should input character data to be printed, should set a detailed format including the length and width of a label tape, vertical writing/horizontal writing, a block-by-block form and a character size one by one and then should print input character data on the label tape according to the set format.

The conventional label printers involve a troublesome task of inputting data, particularly, format setting data, do not allow users to easily prepare elaborate label tapes.

Further, depending on the width of the label tape in use, printing may not be executed according to the set format data, making the setting of the format difficult. The same problem also arises in selecting the frame, so that printing may not be executed according to the selected frame data.

SUMMARY OF THE INVENTION

Accordingly, it is a primary object of the present invention to provide a printing apparatus and a printing method which can easily print input print data in accordance with an elaborate form or a predetermined, fixed printing format.

It is another object of this invention to provide a printing apparatus and a printing method which can print input print data in accordance with the proper format or frame that matches with the size or width of a printing medium.

To achieve the above objects, according to the first aspect of this invention, there is provided a printing apparatus comprising fixed format data storage means storing plural types of fixed format data respectively corresponding to a plurality of printing media with different widths; width detecting means for detecting a width of a printing medium; selecting means for selecting fixed format data corresponding to the width of the printing medium, detected by the width detecting means, from the plural types of fixed format data stored in the fixed format data storage means; input means for inputting print data to be printed; and printing means for printing the print data, input by the input means, on the printing medium in accordance with a format based on the fixed format data selected by the selecting means.

The fixed format data includes data for controlling the layout of input character data, the character size, the printing direction (vertical writing/horizontal writing), the character type (boldface, italics, unfilled), decoration (screening, underline), tape length, etc.

The printing apparatus according to the first aspect can print on a printing medium in accordance with the proper format or frame that matches with the size or width of the printing medium without burdening a user with the troublesome setting of the form, tape length or tape width and the like.

According to the second aspect of this invention, there is provided a printing apparatus comprising storage means storing plural pieces of first data for printing for associated printing media with different sizes; detecting means for detecting a size of a printing medium; selecting means for selecting one from the plurality of first data stored in the storage means; limiting means for limiting selection of first data by the selecting means to one printable on a printing medium having the size detected by the detecting means; input means for inputting second data to be printed; combining means for combining the second data input by the input means and the first data limited by the limiting means; and printing means for printing the first and second data combined by the combining means on the printing medium.

As the printing apparatus according to the second aspect can limit the selection of first data only to one printable on a printing medium, no first data that cannot be printed is selected, thus reducing a chance of making erroneous selection and setting. Assuming that the printing medium is a label tape and first data is a frame and a fixed format, second data such as characters can be printed together with the frame on the label tape or can be printed according to the fixed format. This printing requires no setting, selection or the like in consideration of the width of the label tape.

BRIEF DESCRIPTION OF THE DRAWINGS

FIGS. 5A through 5G are diagrams showing examples of what is displayed on the display screen of the label printer;

FIG. 7 is a diagram showing a list of selectable items of a fixed format;

FIG. 8A is a diagram exemplifying the contents of a fixed format selection table;

FIG. 8B is a diagram showing a part of the contents of a menu ROM;

FIG. 19 is a diagram exemplifying the storage contents of a frame selection condition storage section shown in FIG. 17;

DETAILED DESCRIPTION OF THE PREFERRED EMBODIMENTS

Preferred embodiments of the present invention will now be described referring to the accompanying drawings.

First Embodiment

To begin with, the structure of a label printer according to the first embodiment of the present invention will be described below with reference to FIG. 1.

Figure 1:
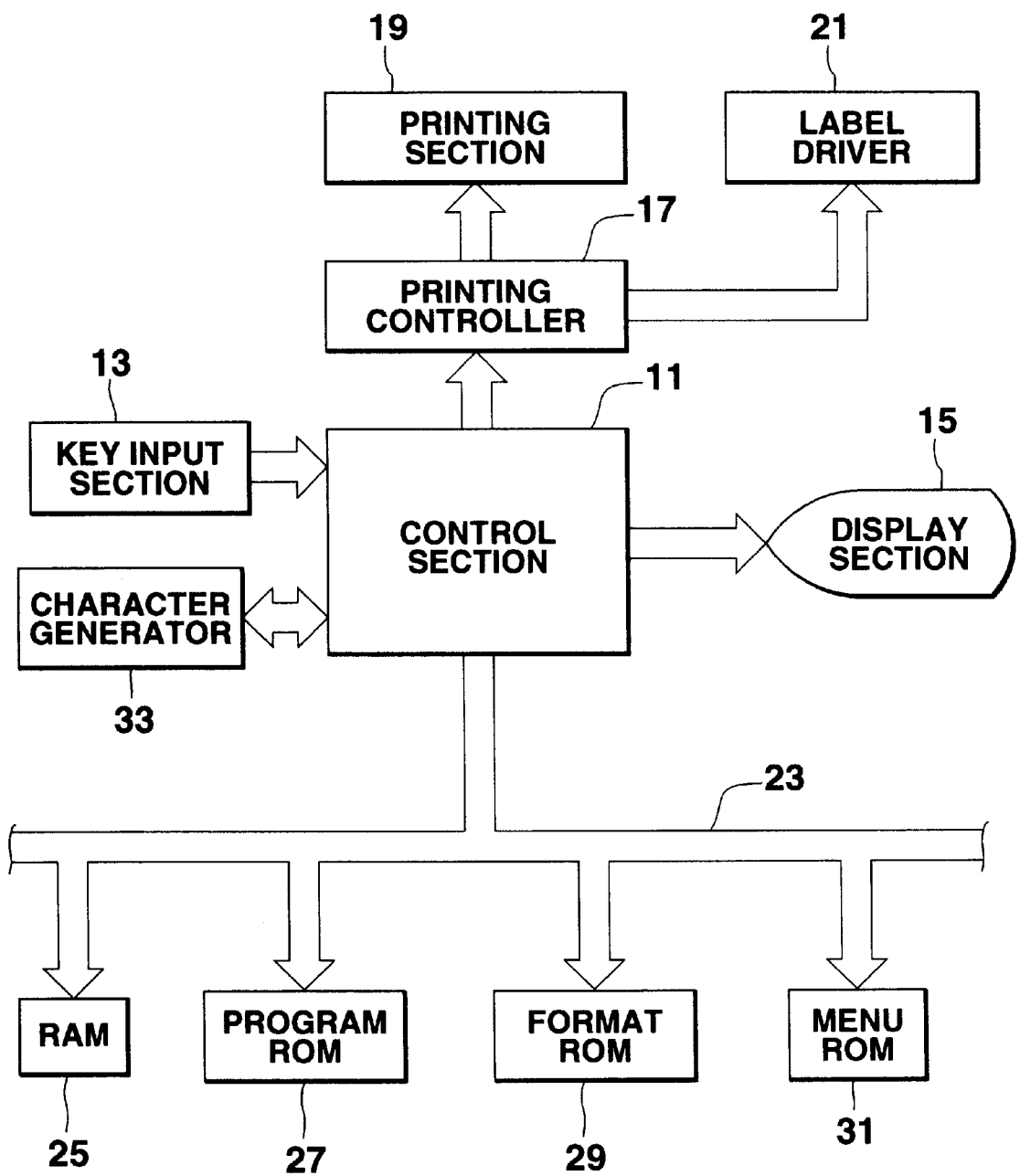
FIG. 1 is a block diagram illustrating the structure of a label printer according to a first embodiment of the present invention.

The label printer shown in FIG. 1 comprises a control section 11, a key input section 13, a display section 15, a printer controller 17, a printing section 19, a label driver 21, a bus 23, a RAM 25, a program ROM 27, a format ROM 29, a menu ROM 31 and a character generator 33.

The control section 11, which includes a microprocessor and its peripheral circuits, controls the general operation of this label printer. The key input section 13 has a keyboard, a keyboard interface and the like, and supplies data, input to this key input section 13, to the control section 11. The keyboard includes character keys, a kana/kanji conversion key (in case of Japanese), cursor keys, a carriage return key, a print key to instruct printing, and a save key to save prepared data. The display section 15 comprises a display device and a display controller, and displays data, a menu, etc. on the display device under the control of the display controller. The display device is constituted of, for example, a dot-matrix type liquid crystal display device.

The printer controller 17 controls the printing section 19 and the label driver 21 under the control of the control section 11. The printing section 19 controls the energization times of the individual heat generating elements (dots) of a thermal head under the control of the printer controller 17. The label driver 21 drives a label tape as a printing medium and an ink ribbon under the control of the printer controller 17.

The RAM 25 has an area serving as a work area for the control section 11 and a save area for storing prepared label data.

The program ROM 27 holds programs the control section 11 executes to prepare a label tape.

The format ROM 29 holds plural types of fixed label format data (hereinafter referred to as "fixed format data"). Plural types of fixed format data are stored for each of target objects where a label tape 141 is to be stuck (e.g., a video cassette, an audio cassette and a floppy disk) and different widths of the label tape 141. As will be discussed later, this fixed format data includes frame data and form data to control the layout, size and direction of input character data, the decoration, etc.

Stored in the menu ROM 31 are menu data for allowing a user to select a process, full image data to show the general layout of each fixed format, message data asking the user to input proper data, and other data.

Various types of data are transferred via the bus 23 between the control section 11 and the RAM 25, the program ROM 27, the format ROM 29 and the menu ROM 31.

The character generator 33 converts the input character data to corresponding character pattern data.

Figure 2A:
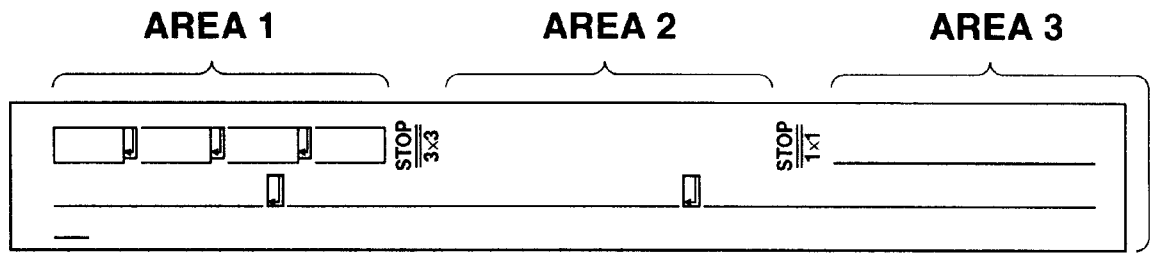
FIG. 2A is a diagram exemplifying a fixed format.
Figure 2B:
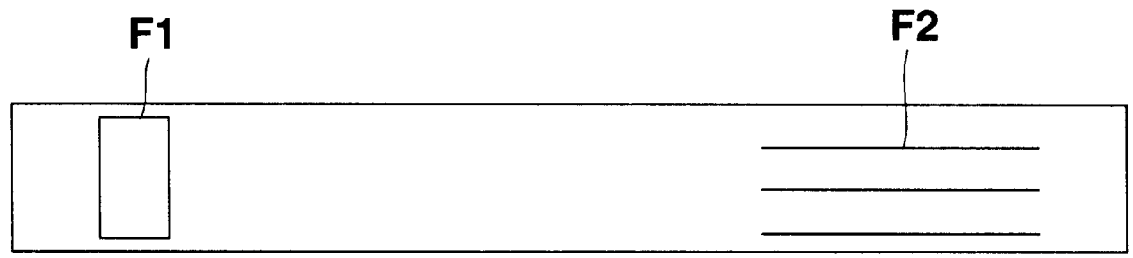
FIG. 2B is a diagram showing a printed image of the fixed format.
Figure 2C:
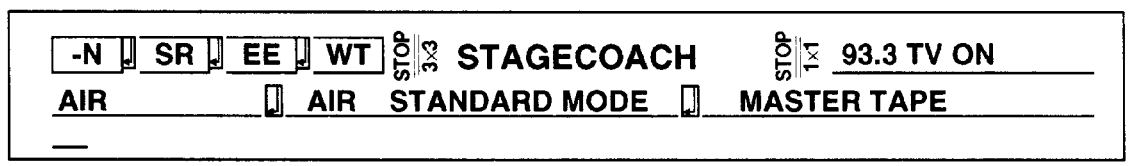
FIG. 2C is a diagram showing input character data inserted in the fixed format.
Figure 2D:
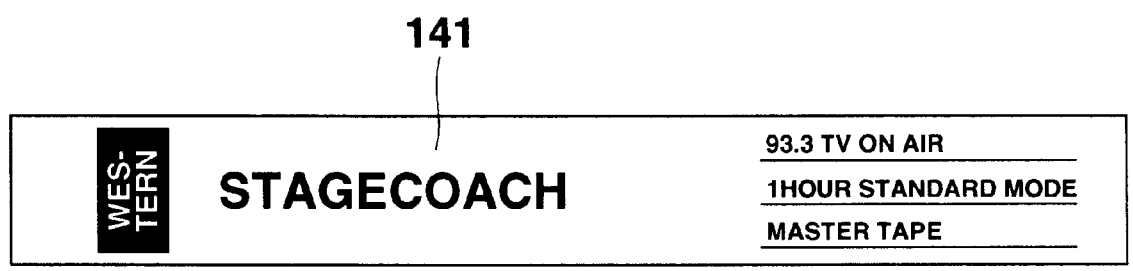
FIG. 2D is a diagram showing one example of a printed label tape.
Figure 3A:
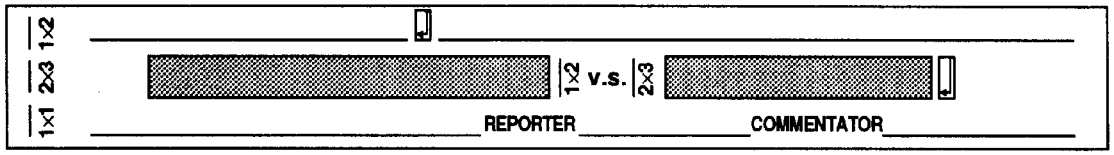
FIG. 3A is a diagram showing another example of a fixed format.
Figure 3B:
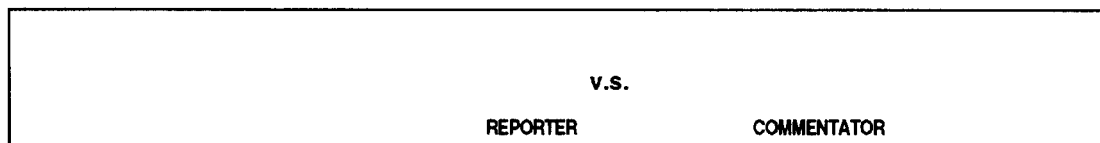
FIG. 3B is a diagram showing a printed image of the fixed format.
Figure 3C:
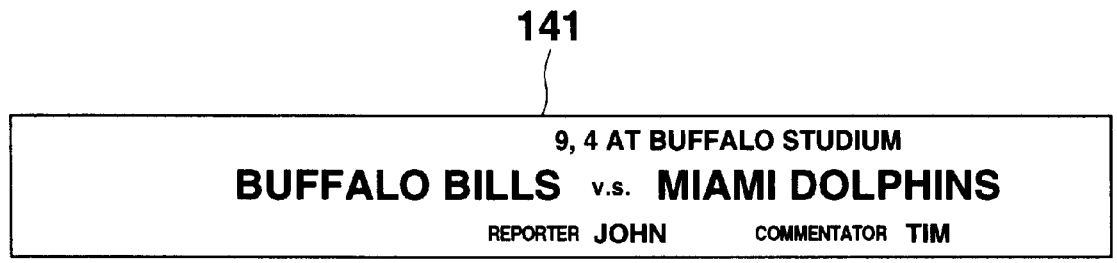
FIG. 3C is a diagram showing one example of a printed label tape.

FIGS. 2A and 3A shows examples of fixed formats for label tapes for VHS video cassettes. FIGS. 2B and 2D and FIGS. 3B and 3C show print images of the label tapes 141 after data is printed in accordance with the fixed formats in FIGS. 2A and 3A. FIGS. 2B and 3B show print images of the label tapes 141 on which only blank fixed formats for VHS video cassettes without entry of any character data have been printed. FIGS. 2D and 3C show print images of the label tapes 141 on which input character data has been printed in accordance with blank fixed formats for VHS video cassettes.

A print area 1 in the fixed format shown in FIG. 2A is where character data of the classification name or the genre name to be printed in a frame F1 is to be inserted. For example, the vertical writing, the tape length of 0, 8 cm, the character size of 1 (vertical)×1 (horizontal), the unfilled characters, the carriage return position, etc. are set as attribute data in the form data for this print area 1. A print area 2 in the fixed format is where character data of the title to be printed is to be inserted. For example, the horizontal writing, the tape length of 8 cm, the character size of 3×3, etc. are set as attribute data in the form data for this print area 2. A print area 3 in the fixed format is where character data indicating various item names, such as note data to be printed above an underline F2 as a frame, is to be inserted. For example, the horizontal writing, the tape length of 6 cm, the character size of 1×1, the carriage return position, etc. are previously set as attribute data in the form data for this print area 3.

Stored in the menu ROM 31 is message data which asks the user to input character data for each print area in each fixed format mentioned above. For example, the message data includes "please enter a classification name in XX or less characters" for the print area 1 (XX indicates a predetermined number), "please enter a title in XX or less characters" for the print area 2, and "please enter note data" for the print area 3.

With regard to the fixed format shown in FIG. 3A, likewise, vertical or horizontal writing, the tape length, the character size, the character type (boldface, italics, unfilled), decoration (designation of screen printing), the carriage return position, etc. are set as form data. Character data such as "v.s.," "on-the-spot telecast" and "commentator" is set as the frame data. With regard to the fixed format shown in FIG. 3A, for example, message data such as "please enter a team name, date and place," "please enter the opponent" and "please enter the names of a reporter and a commentator" is stored in the menu ROM 31.

The operation of the label printer according to this embodiment will now be described specifically in the case of preparing the label tape for a VHS video cassette shown in FIG. 2D.

When the label printer is powered on, the control section 11 starts the operation in accordance with the programs stored in the program ROM 27 to execute initialization, etc. and then display an initial menu for selecting processes on the display section 15.

Figure 4:
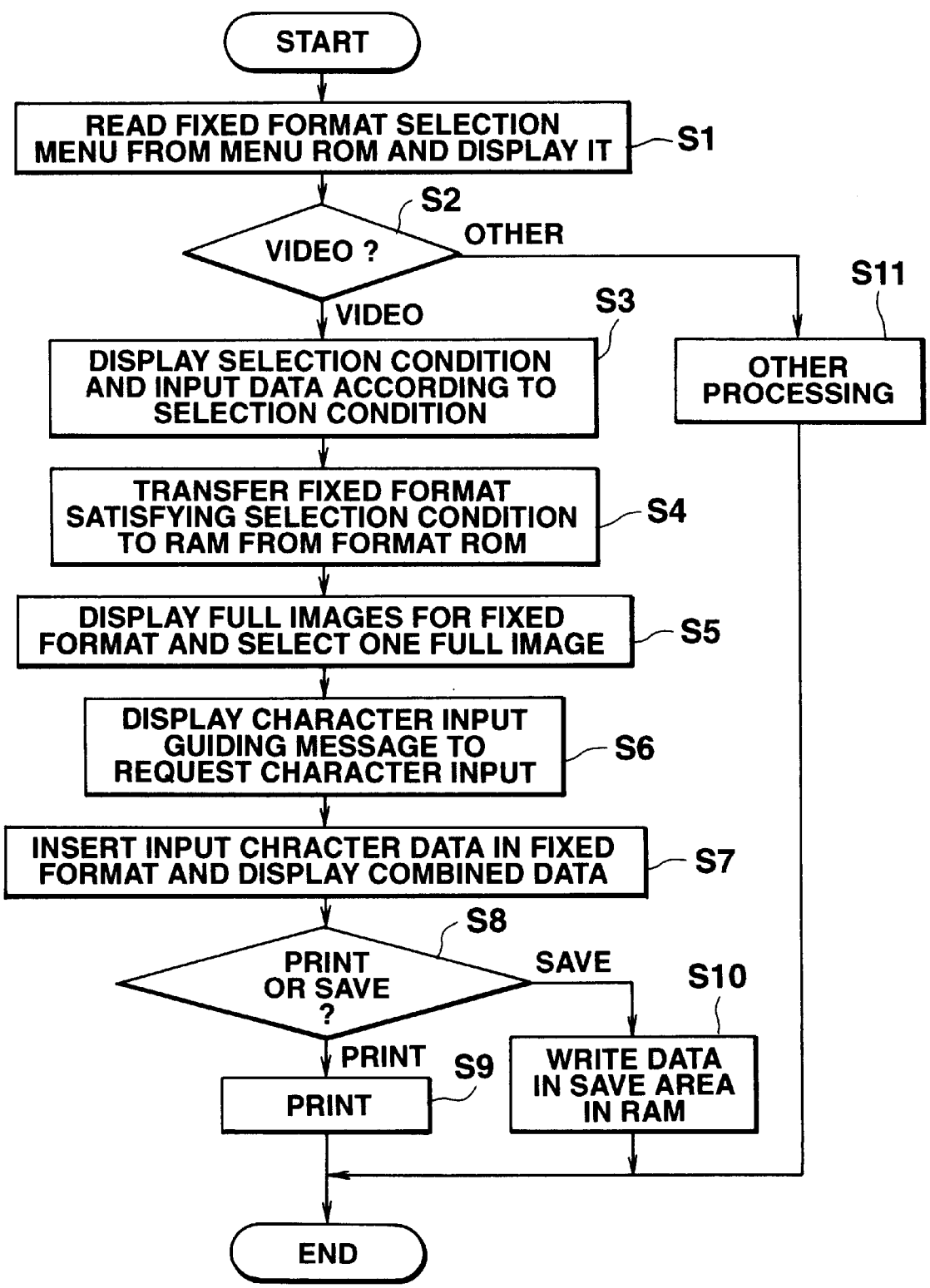
FIG. 4 is a flowchart for explaining the operation of the label printer shown in FIG. 1.

When the user operates the key input section 13 to select the preparation of a label tape using a fixed format and printing from the initial menu, the control section 11 starts the sequence of processes in the flowchart illustrated in FIG. 4.

First, the control section 11 reads menu data for the selection of fixed texts from the menu ROM 31 and displays the menu data on the display section 15 (step S1). This fixed text selection menu data lists the names of print targets for which fixed formats have been prepared, together with a cursor K as shown in FIG. 5A; the cursor K is illustrated as a frame.

The user manipulates the cursor key on the key input section 13 to move the cursor K to the desired print target on the display section 15, and then depresses the carriage return key to select the desired print target (step S2). In this example, a video cassette is selected.

The control section 11 displays a selection menu on the screen of the display section 15 for each selection condition for the fixed format of the selected print target. Accordingly, the control section 11 reads selection menus for, for example, a video cassette, which request the selection of the width of a label tape (FIG. 5B), the selection of vertical writing or horizontal writing (FIG. 5C), the selection of the number of lines, etc., from the menu ROM 31 and displays those menus on the display section 15.

The user enters item data according to the individual displayed selection menus by operating the key input section 13 (step S3). The control section 11 reads one or plural types of fixed format data satisfying the entered item data from the format ROM 29 and writes the fixed format data in the work area in the RAM 25 (step S4).

Further, the control section 11 displays full images Z1 and Z2 showing the full layout of the fixed format after printing, which corresponds the fixed format data read from the format ROM 29, on the display section 15 as shown in FIG. 5D. In this example, the full images Z1 and Z2 for two different fixed formats are displayed on the display section 15.

The user selects the desired full image from the displayed full images Z1 and Z2 for the fixed formats by operating the key input section 13 (step S5). In this example, the upper full image Z1 is selected by the user. According to this selection, the fixed format corresponding to the upper full image Z1 for the fixed format is selected.

The control section 11 reads message data, which corresponds to the selected fixed format and asks the user to enter character data, from the menu ROM 31 and sequentially displays the message data on the display section 15. The user should enter character data according to the guidance. More specifically, the control section 11 reads the message data for the print area 1, "please enter a classification name in XX or less characters," from the menu ROM 31 and displays it as shown in FIG. 5E. According to the displayed guidance, the user enters "western". The procedures for inputting the characters, the kana/kanji converting procedures (in case of Japanese), and the like are the same as those for the conventional label printer. While the input character data is sequentially stored in the work in the RAM 25, it is converted to a display character pattern by the character generator 33 and the display character pattern is displayed on the display section 15 (FIG. 5A).

When the entry of the character data in a predetermined number of characters or less characters is completed or the carriage return key is depressed, the control section 11 reads the message data for the print area 2, "please enter a title in XX or less characters," from the menu ROM 31 and displays the associated message on the display section 15 as shown in FIG. 5F. Following the guidance, the user enters character data "Stagecoach." When the entry of the title is completed, the control section 11 reads the message data for the print area 3, "please enter note data," from the menu ROM 31 and displays the associated message on the display section 15. Following the displayed message, the user inputs other item data, "93.3. TV ON AIR (return) 1 hour standard mode (return) MASTER TAPE."

When the entry of the character data is completed, the control section 11 inserts the input character data in the currently designated fixed format in accordance with the form data previously set for this fixed format data, yielding combined data of the input character data and the fixed format data, stores the combined data in a predetermined area in the RAM 25 and displays the combined data (step S7). The combined data stored in the RAM 25 may look like the one shown in FIG. 2C. With regard to the print area 1, the input character sequence "western" is separated into the first row of a character sequence "-n," the second row of a character sequence "sr," the third row of a character sequence "ee," and the fourth row of a character sequence "wt," and inserts the character sequence segments in the fixed format data to prepare combined data.

To print the prepared combined data, the user operates the print key on the key input section 13 (step S8). The control section 11 reads the combined data from the work area in the RAM 25, executes processing, such as character enlargement, rotation, unfilling, etc. in accordance with the form data to produce a print pattern (dot pattern), and supplies the print pattern to the printer controller 17. The printer controller 17 controls the driving of the heat generating elements of the thermal head constituting the printing section 19 in accordance with the supplied print pattern, and prints the prepared, combined data (frame data and character data) on the label tape 141 as shown in FIG. 2D while causing the label driver 21 to control the feeding of the label tape 141 and the ink ribbon (step S9).

When the save key of the key input section 13 is operated in step S8, the control section 11 writes the combined data in the predetermined area in the RAM 25 into the save area in the RAM 25 (step S10).

When the user instructs the preparation of a label tape for other than a video, for example, for a floppy disk, in step S2, the label tape for a floppy disk is prepared in the same manner as done for the label tape for a video cassette. In this case, the size of the floppy disk (8 inches, 5 inches, 3 inches), the width of the label tape, and the like are specified as the selection conditions to select the proper label format.

According to the first embodiment, as described above, as plural pieces of fixed format data are stored in the format ROM 29 for the associated print targets on which label tapes are to be stuck, the user can quickly and easily make printing on the label tape 141 according to the desired fixed format, without separately setting the character size, the character type, the writing direction (vertical/horizontal), etc., simply by selecting the proper fixed format from among those fixed formats and inputting necessary character data.

The fixed formats and print patterns shown in FIGS. 2A to 2D and FIGS. 3A to 3C are to be considered as illustrative and not restrictive.

Although the width of the label tape, the vertical writing/horizontal writing, the number of lines, and so forth are given as the conditions for selecting a fixed format, other selection conditions may be set as well.

With "movie," "sports on TV hookup," etc. are set as the selection conditions, for example, the fixed format shown in FIG. 2A may be used when "movie" is selected, while the fixed format shown in FIG. 3A may be used when "sports on TV hookup" is selected.

Although guiding message data for each print area of the fixed format is set and displayed in the first embodiment, such message data may not necessarily be provided. Although guiding message data for each print area of the fixed format has been set previously in the first embodiment, message data may be prepared from the number of print areas, the number of input characters, and so forth, and then displayed.

Simple insertion of character data in the fixed format data may not be enough for the user to properly imagine the actual print image. In this respect, the output image (FIG. 2D or 3C) may be displayed on the display section 15 so that the user instructs to start printing when the displayed image is satisfactory.

Although fixed format data is generally stored in a ROM at the time the label printer is manufactured, the structure may be modified so that the user can prepare the data and saves it later.

Second Embodiment

Plural types of label tapes with different widths are mountable in a label printer and print data is printable on the actually mounted label tape. Depending on the width of the mounted label tape, there may be a unprintable fixed format. According to the first embodiment, when such an event occurs, the user should determine and select a usable fixed format himself or herself. This work is troublesome. The second embodiment is therefore designed to be able to automatically select the usable fixed format according to the width of the mounted label tape.

Figure 6:
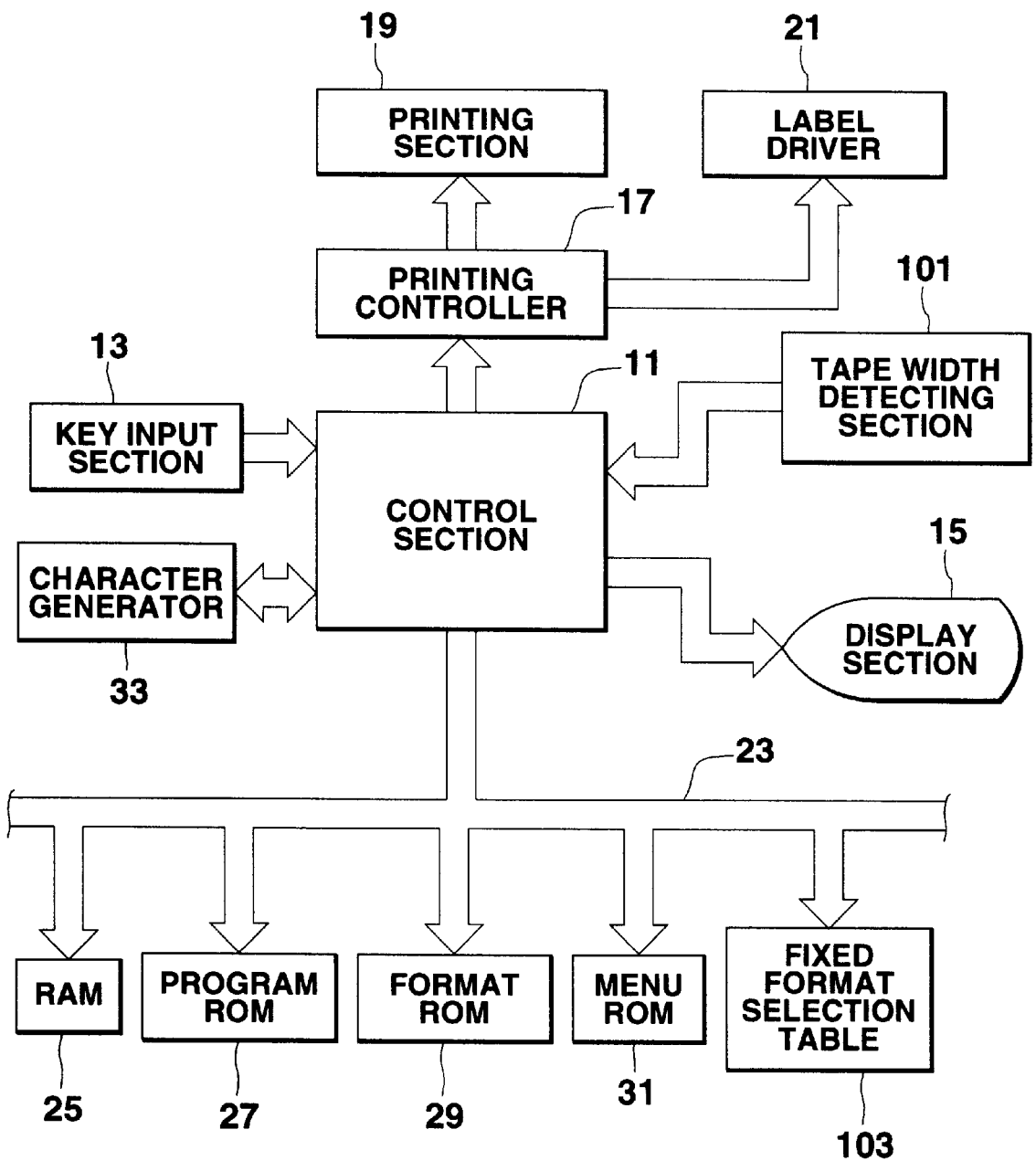
FIG. 6 is a block diagram illustrating the structure of a label printer according to a second embodiment of this invention.

FIG. 6 shows the structure of a label printer according to the second embodiment.

As shown in FIG. 6, this label printer has a tape width detecting section 101 and a fixed format selection table 103 in addition to the structure shown in FIG. 1.

Figure 15:
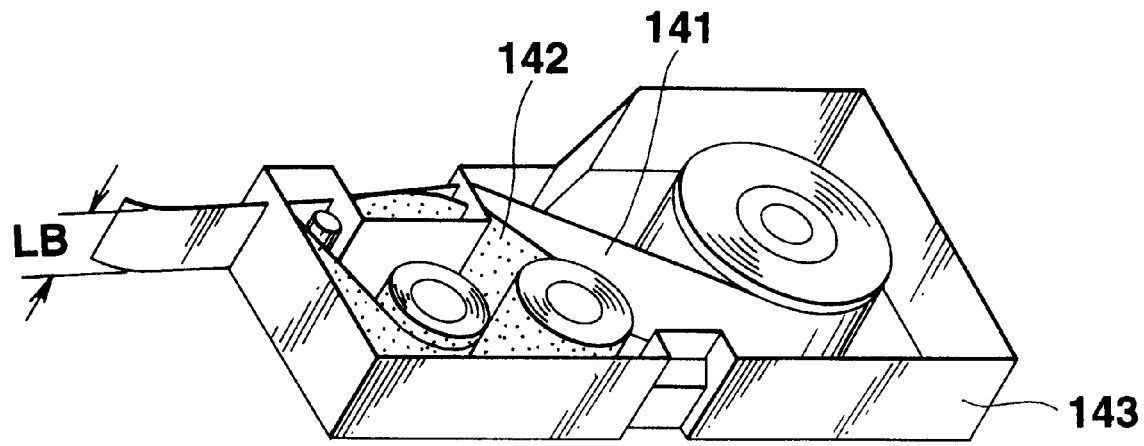
FIG. 15 is a diagram showing the structure of a tape cassette.
Figure 16:
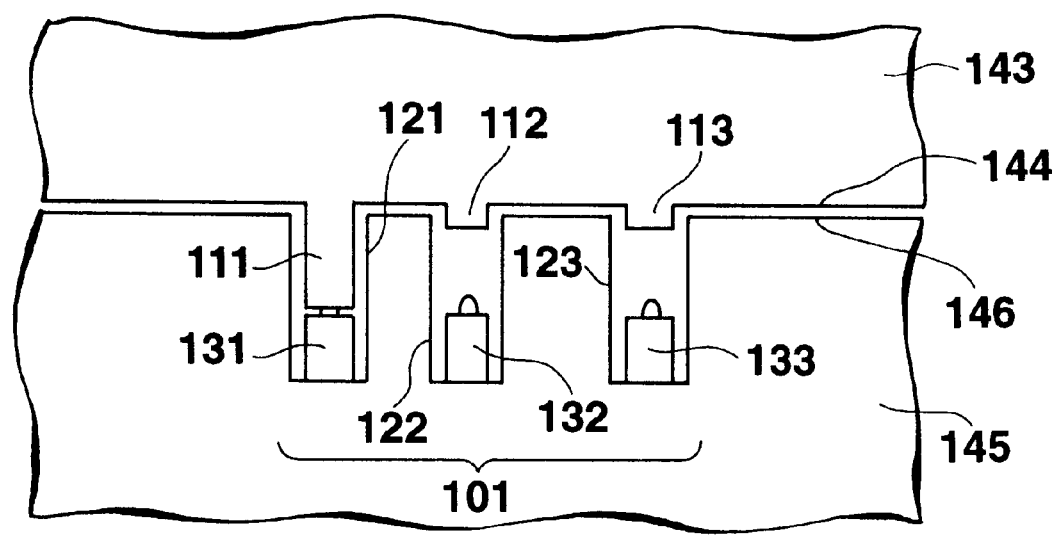
FIG. 16 is a diagram showing a tape cassette and a cassette mounting portion of a label printer assembly.

The tape width detecting section 101 detects the type of a tape cassette 143 loaded in a label printer assembly 145 and detects the width, LB, of the label tape 141 retained inside the cassette 143 as shown in FIGS. 15 and 16. (The details of the method of detecting the width LB will be given later.) In this embodiment, the tape cassette 143 accommodating the label tape 141 having a width of 6 mm, 9 mm, 12 mm, 18 mm or 24 mm is mountable in the label printer assembly 145, and the tape width detecting section 101 detects the type of the mounted tape cassette 143 to automatically determine the width LB of the label tape 141 placed in the tape cassette 143.

FIG. 7 shows a list of the usages and contents of fixed formats in the second embodiment, the widths of usable label tapes for the fixed formats, and default writing directions (vertical or horizontal) at the time the individual fixed formats are to be printed.

As shown in FIG. 8A, the fixed format selection table 103 holds data about "usage names" and "detailed usage names" selectable for the individual widths of the label tapes 141 in accordance with item data for fixed formats shown in FIG. 7.

In the example of FIG. 7, the fixed format for audio is printable only on a label tape 12 mm or 9 mm wide. In the rows of "24 mm" and "18 mm" as the tape width in the fixed format selection table 103, therefore, "non-selectable" is set in the column of "audio" as the "usage name" as shown in FIG. 8A. For a similar reason, in the rows of "24 mm" and "18 mm" in the format selection table 103, "8 mm video" is not described in the column of "video" as the "usage name."

With reference to the flowchart in FIG. 9, a description will now be given of the procedures for the label printer with the above structure to print on a label tape in accordance with fixed formats previously set.

In printing on a label tape according to a previously set fixed format, the user operates the key input section 13 to instruct on the initial screen the use of a fixed format to make a print on a label tape, as per the first embodiment. When this instruction is given, the sequence of processes in the flowchart in FIG. 9 starts.

First, the control section 11 loads information on the width LB of the label tape 141 from the tape width detecting section 101 (step T1), and determines whether the width of the label tape 141 placed in the tape cassette 143 mounted in the label printer assembly 145 is 9 mm or wider, or the tape cassette 143 is mounted in the label printer assembly 145 (step T2).

Figure 11A:
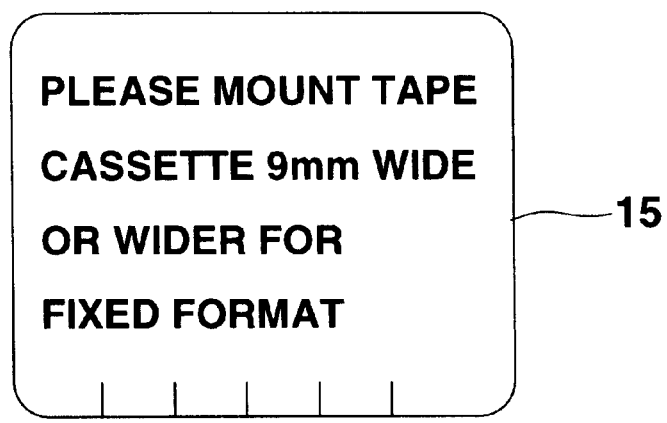
FIGS. 11A and 11B are diagrams showing examples of what is displayed on the display screen of the label printer.
Figure 11B:
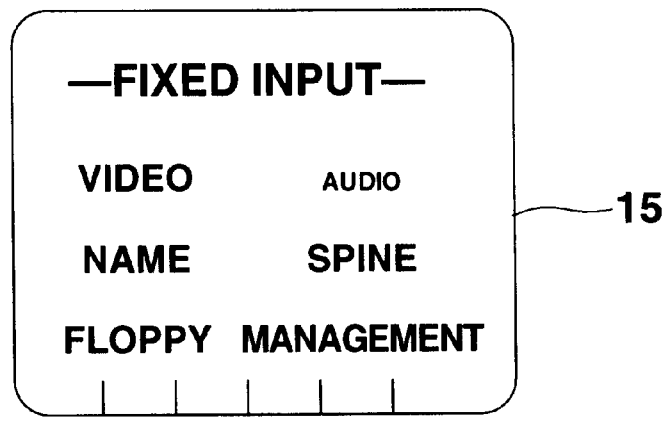

When the detected width of the label tape 141 is determined to be less than 9 mm or no tape cassette 143 is found mounted at step T2, printing on the label tape using a fixed format is not possible so that the flow proceeds to step T3. At step T3 an alarm message "insert a tape cassette 9 mm wide or wider to use a fixed format" as shown in FIG. 11A in order to request the user of the loading of the cassette 143 holding the label tape 141 having a width of 9 mm or wider.

Figure 13A:
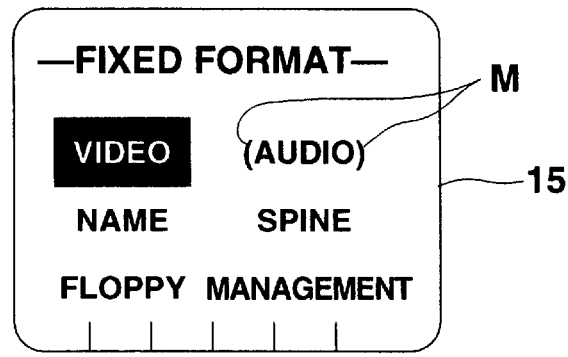
FIGS. 13A through 13D are diagrams showing examples of what is displayed on the display screen of the label printer.

When it is determined at step T2 that the tape cassette 143 containing the label tape 141 9 mm wide or wider is mounted, the flow proceeds to step T4. At step T4, the control section 11 accesses the fixed format selection table 103 and displays a list of the usage names for which the fixed format usable for the width of the currently installed label tape 141 is prepared, such as "video, audio, name," as shown in FIG. 13A.

Figure 10:
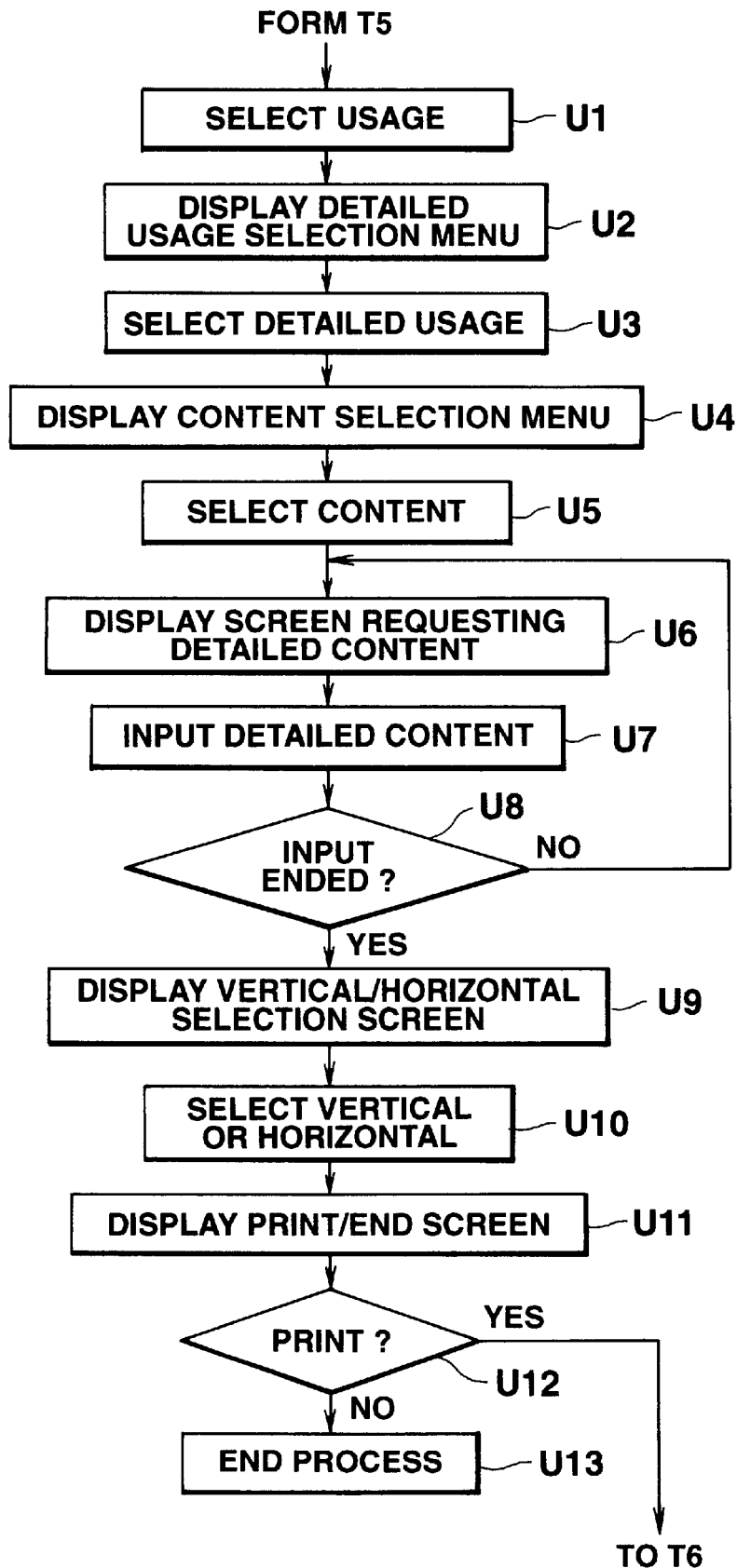
FIG. 10 is a flowchart for explaining the selection of a fixed format and data edition.

Thereafter, the selection of a fixed format and edition of data are executed in accordance with the key operation until the start of printing is instructed (steps T5 to T7). The details of the operation for the selection of the fixed format and data edition will be given later with reference to FIG. 10.

When the edition of data is completed and the start of printing is instructed, this instruction is detected at step T6 and the flow goes to step T8.

At step T8, the control section 11 determines if the width LB of the installed label tape 141 is less than 18 mm.

According to the second embodiment, two types of fixed formats with different printing widths though having the same appearance and contents are prepared for each "usage" and "content," and the narrower fixed format is selected when the installed label tape 141 has a width equal to or less than 12 mm (step T9), fixed format data corresponding to the selected fixed format and the input data edited at steps T5–T7 are combined as in the first embodiment to yield combined data and the combined data is printed (step T10).

When the width LB of the installed label tape 141 is equal to or greater than 18 mm, the wider fixed format is selected (step T11), fixed format data corresponding to the selected fixed format and the input data edited at steps T5–T7 are combined to yield combined data and the combined data is printed (step T10).

Examples of printing on the label tape 141 are illustrated in FIGS. 12A to 12D. Those print examples show the fixed formats for "video" as the usage name, "beta" as the detailed usage name and "comedy" as the content name (title); two types (wide and narrow) of fixed formats with the same appearance and contents are used in accordance with the width LB of the label tape 141.

Figure 12A:
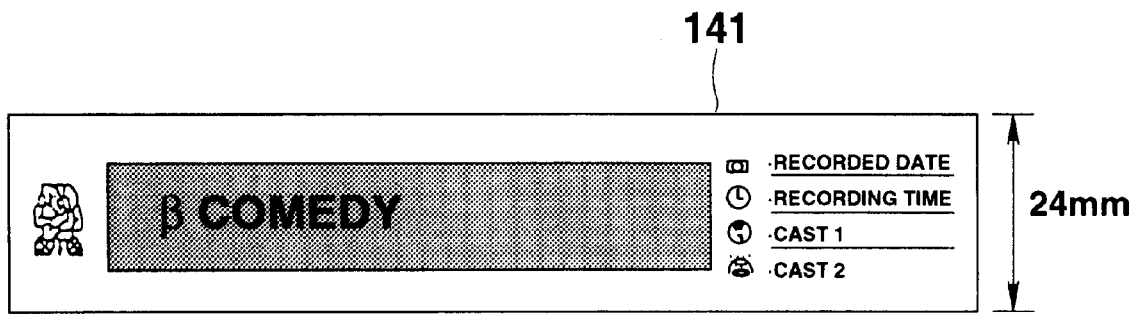
FIGS. 12A through 12E are diagrams showing examples of what is printed by the label printer.
Figure 12B:
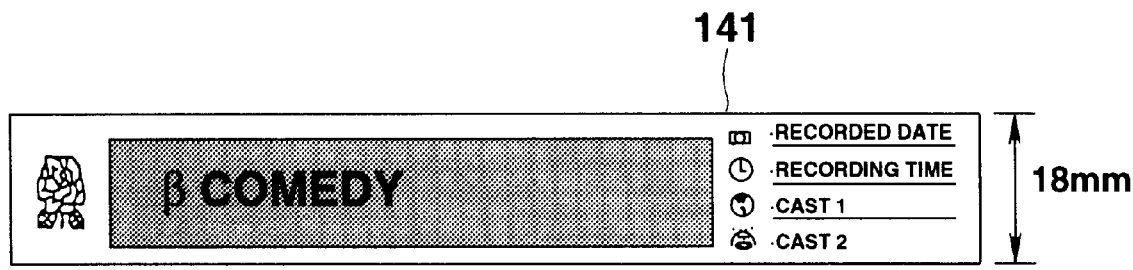
Figure 12C:
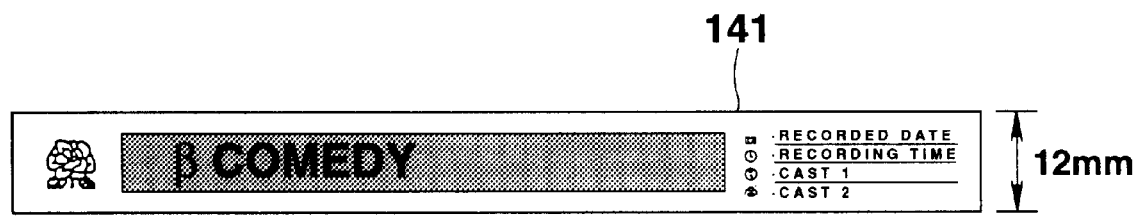
Figure 12D:
Figure 12E:
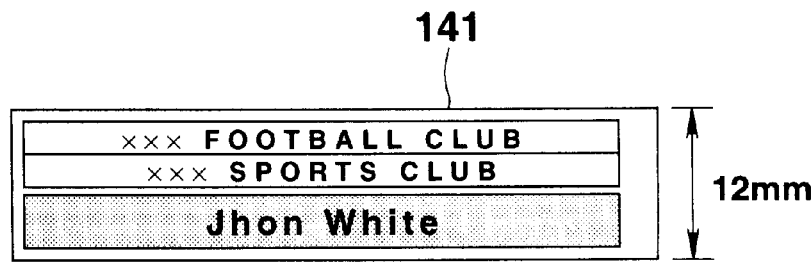

More specifically, the fixed format with a wide printing width is used for the label tape 141 having a width of 24 mm or 18 mm shown in FIGS. 12A or 12B while the fixed format with a narrow printing width is used for the label tape 141 having a width of 12 mm or 9 mm wide shown in FIGS. 12C or 12D. FIG. 12E exemplifies a fixed format for "name" as the usage name, "name plate" as the "detailed usage name" and "ordinary person" as the content name (title) in which case the label tape 141 has a width LB of 12 mm.

With reference to FIGS. 10, 13A to 13D and 14A to 14D, a specific description will be given of the edition that is executed at steps T5 to T7 in the case where the tape cassette 143 containing a label tape 18 mm in width is mounted in the label printer assembly 145.

Figure 9:
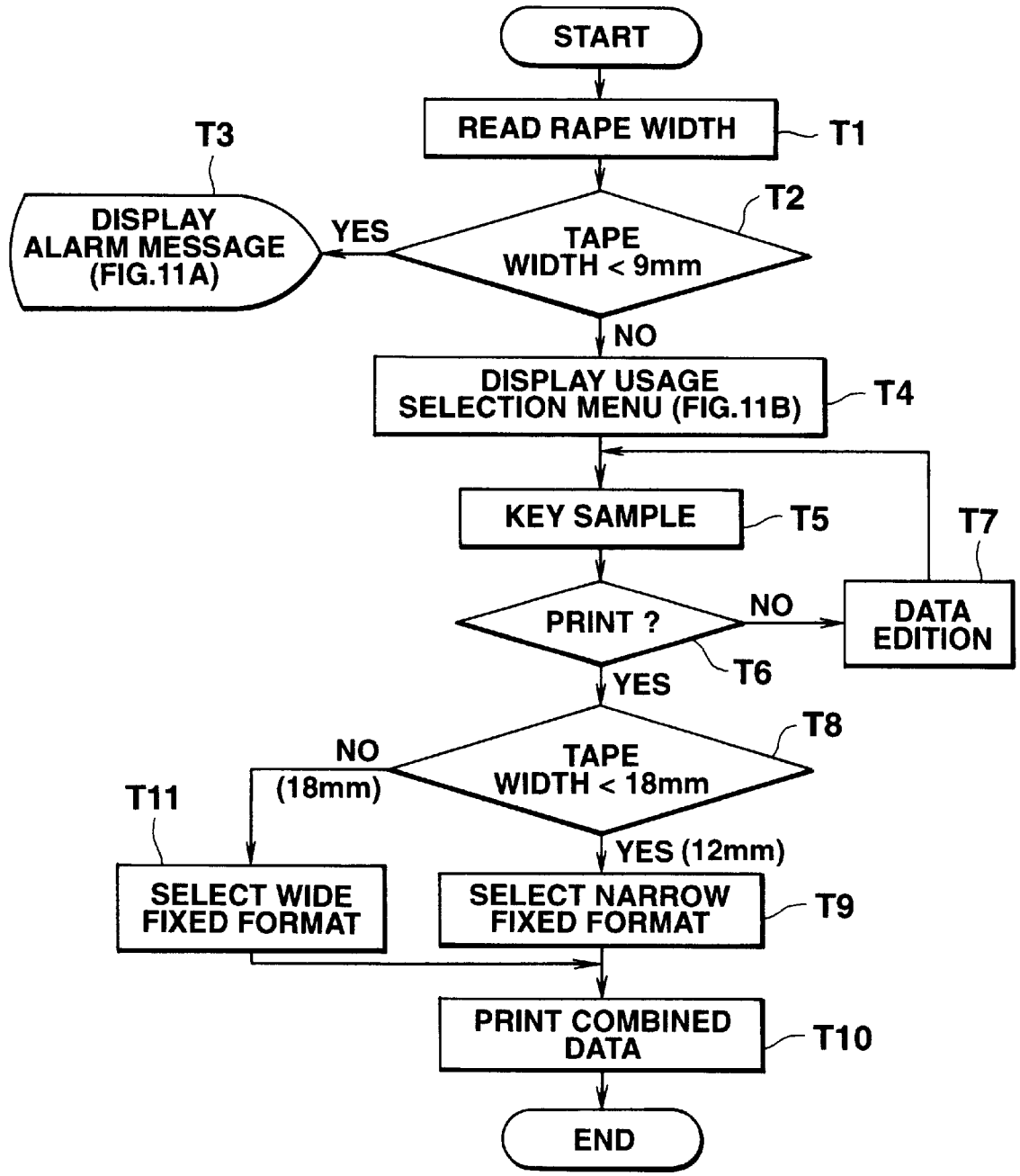
FIG. 9 is a flowchart for explaining the operation of the label printer according to the second embodiment.

In this case, when the width LB of the label tape 141 is detected to be greater than 9 mm at step T2 in FIG. 9, the flow proceeds to step T4.

According to the contents of the fixed format selection table 103 shown in FIG. 8A, when the width LB of the installed label tape 141 is 18 mm, "video," "spine," "floppy," "name" and "management" are selectable as usage names. At step T4, therefore, the control section 11 displays a menu for selecting the usage name, such as "video," "name" or "spine," as shown in FIG. 13A, on the display section 15 in FIG. 6. In this case, since the usage name "audio" is not prepared and is not thus selectable for the label tape 141 whose width LB is 18 mm, marks M are displayed in front and back of "audio" to indicate this "audio" is unselectable. The display data (not shown) on the menu for usage name selection is previously stored in the menu ROM 31 in FIG. 6 for each width LB of the label tape 141.

The user operates the key input section 13 to select an arbitrary usage name from a plurality of usage names (step U1). It is assumed here that the user has selected "video."

Figure 13B:
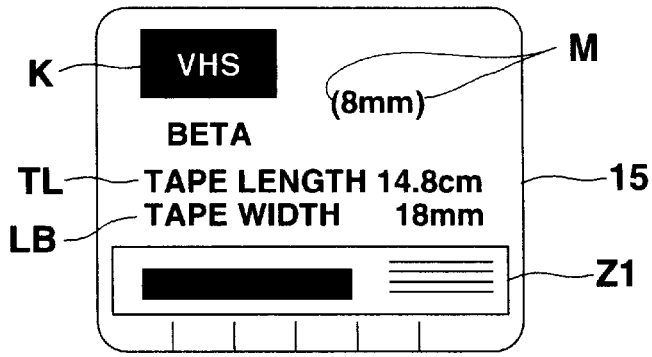

According to the contents of the fixed format selection table 103 shown in FIG. 8A, fixed format data for VHS and beta have been prepared for the label tape 18 mm wide, but no fixed format data for an 8 mm video cassette has been prepared. Therefore, the control section 11 displays a menu for detailed usage names on the display section 15 to request the user to select either VHS usage or beta usage, not 8 mm size, as shown in FIG. 13B (step U2). The display data on this menu is stored in the menu ROM 31 for each width LB of the label tape 141.

Further stored in the menu ROM 31 are format full image data representing the outlines of the full images of fixed formats prepared for individual usage names, length data representing the length of the label tape previously set for each fixed format to print this format, and tape width data indicating the width LB of the label tape 141 in the mounted cassette 143, as shown in 8B. When the width LB of the label tape 141 in the mounted cassette 143 is detected by the tape width detecting section 101, the tape width data cor-responding to the detected width LB is read from the menu ROM 31 and the associated tape width LB is displayed according to the read tape width data (FIG. 13B). At the same time, the format full image data corresponding to the currently selected fixed format and the length data of the label tape are read from the menu ROM 31 and the associated format full image Z1 and tape length TL are displayed according to the individual read data (FIG. 13B).

Figure 13C:
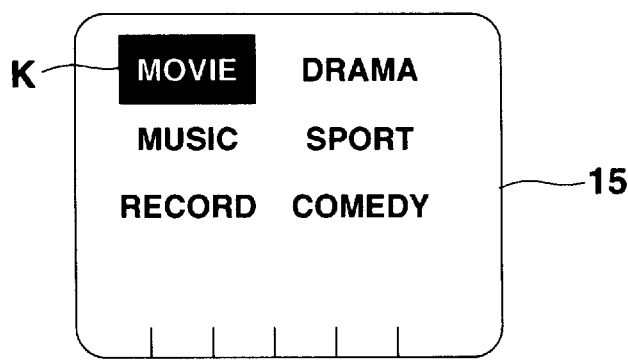

Under this situation, the user operates the key input section 13 to select an arbitrary one of the displayed, detailed usage names (step U3). It is assumed here that the user has moved the cursor K to select "VHS" using the cursor keys. Then, the control section 11 displays a menu for selecting a content name on the display section 15 to ask the user of the content name as shown in FIG. 13C (step U4). The display data on this menu is also stored in the menu ROM 31.

The user selects an arbitrary content name from the displayed content names (step U5). It is assumed here that the user has moved the cursor K to select "drama" using the cursor keys. The fixed format for drama has "title," "recorded date," "recording time," "cast 1" and "cast 2" as the detailed content names as shown in FIG. 7.

The control section 11 displays a screen requesting the user of the detailed content name (step U6), and the user enters the content name according to this display (step U7). The steps U6 and U7 are repeated until it is determined at step U8 that the entry of all the content names is completed.

Figure 13D:
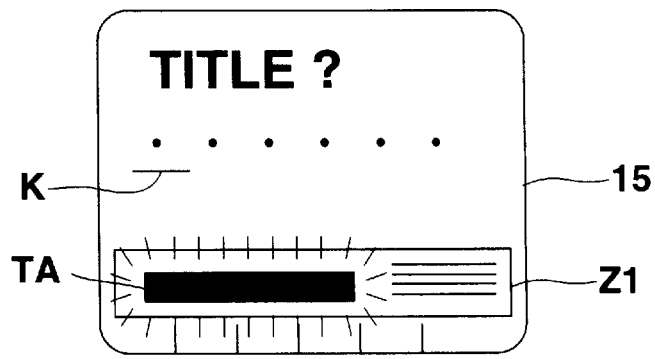

In other words, the control section 11 displays a screen "title?" requesting the first data input item "title" as shown in FIG. 13D. At this time, an area TA in the full image Z1 of the fixed format for drama, which corresponds to where the title is to be printed, is blinked by the control section 11.

Figure 14A:
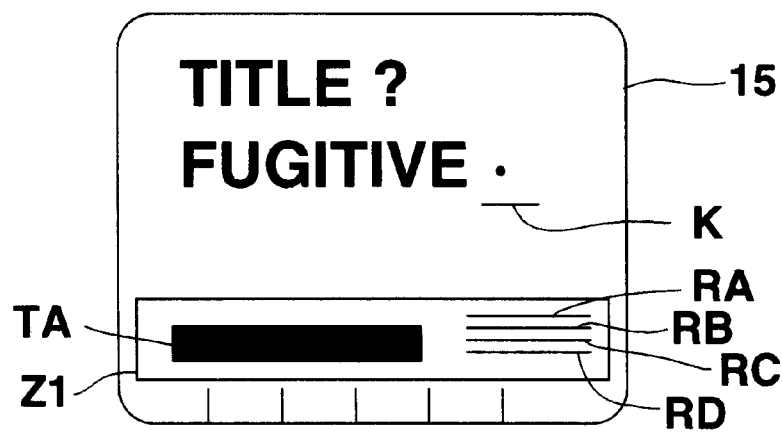
FIGS. 14A through 14C are diagrams showing examples of what is displayed on the display screen of the label printer.
Figure 14B:
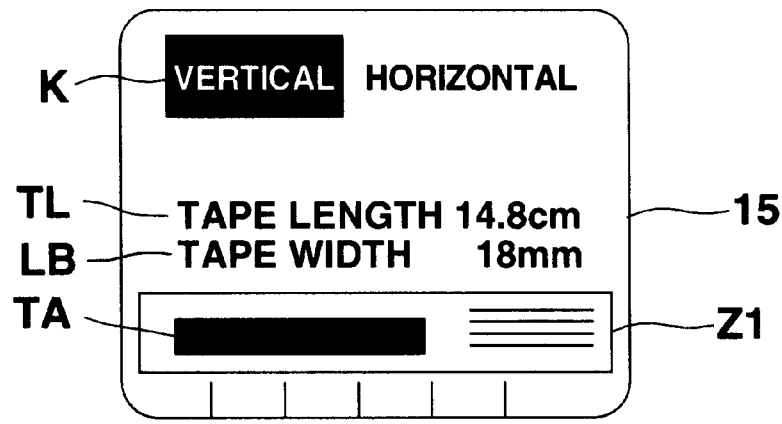

When the user enters "Fugitive" as the title (first data input item) as shown in FIG. 14A, the control section 11 saves the input character data in the RAM 25 and switches the display to the screen requesting the user of "recorded date" as the second data input item. At this time, an area RA in the fixed format, which corresponds to the area where "recorded date" is to be printed, is blinked by the control section 11.

Thereafter, a similar operation is repeated and necessary character data, etc. are sequentially input while blinking the areas RB-RD corresponding to where "recorded date," "recording time," "cast 1" and "cast 2" are to be printed. When the data entry for all the items is completed, this is detected at step U8.

Figure 14C:
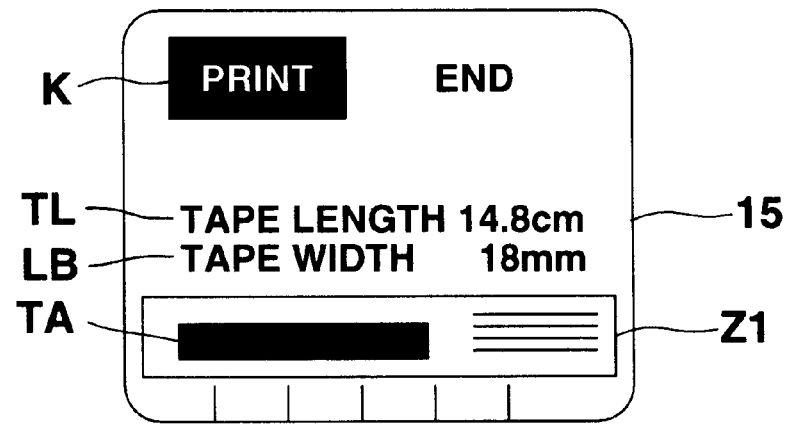

The flow then proceeds to step U9 at which a selection screen for the printing direction (vertical or horizontal) is displayed (step U9). When one direction is selected (step U10), a screen to select printing or termination is displayed as shown in FIG. 14C (step U11). When "print" is selected, this selection is detected at step T6 in FIG. 9 and the printing process starting from step T8 are executed.

When "end" is selected with the selection screen in FIG. 14C displayed, the data input process prior to the printing of the label tape is terminated (step U12).

The mechanism for detecting the width of the installed label tape 141 will now be described.

In FIG. 15 the label tape 141 is installed together with the ink ribbon 142 in the tape cassette 143. FIG. 15 shows the tape cassette 143 with its top cover removed.

Three projections 111, 112 and 113 are formed on a label-printer mounting side 144 of the tape cassette 143 as shown in FIG. 16. Three recesses (small holes) 121, 122 and 133 matching with the projections 111 to 113 are formed in a tape-cassette mounting side 146 of the label printer assembly 145. Microswitches 131, 132 and 133 are respectively placed in the recesses 121, 122 and 123, so that ON/OFF signals from the microswitches 131–133 are supplied to the tape width detecting section 101.

The projection 111 of the tape cassette 143 which retains the label tape 141 having a 9-mm width is long and the projections 112 and 113 are shorter. The projection 112 of the tape cassette 143 which retains the 12-mm label tape 141 is long and the projections 111 and 113 are shorter. The projections 111 and 112 of the tape cassette 143 which retains the 18-mm label tape 141 are long and the projection 113 is shorter. The projection 113 of the tape cassette 143 which retains the 24-mm label tape 141 is long and the projections 111 and 112 are shorter.

With the tape cassette 143 mounted in the label printer assembly 145, the long projection turns on the associated microswitch while the short projection turns off the associated microswitch.

With no tape cassette 143 mounted, therefore, the microswitches 131–133 are all turned off. For example, when the tape cassette 143 holding the 9-mm label tape 141 is mounted, the microswitch 131 is turned on and the microswitches 132 and 133 remain set off. When the tape cassette 143 holding the 18-mm label tape 141 is mounted, the microswitches 131 and 132 are turned on and the microswitch 133 remains set off. The tape width detecting section 101 decodes the ON/OFF signals from the microswitches 131–133 to determine the width of the label tape 141 accommodated in the mounted tape cassette 143.

The long and short projections 111–113 may be combined in any way or may take arbitrary shapes, and are not limited to the illustrated ones.

According to the second embodiment, as described above, since selectable fixed formats are previously determined for each width of the label tape 141, the user should only to mount the desired type of cassette 143 into the label printer assembly 145, requiring no complicated format setting, and character data or the like can be printed beautifully on the label tape 141 according to the proper fixed format for the width of the label tape 141 in use.

Since two types (narrow and wide) of substantially identical fixed formats are prepared and one of them is automatically selected for data printing according the width of the installed label tape 141, print data can be printed, well balanced, within the label tape 141 as shown in FIGS. 12A to 12D.

Although only usable usage names are displayed in the fixed-format usage selection menu in the second embodiment, all the usage names may be displayed so that when an unusable usage name is selected, an alarm may be displayed indicating that the selected name is not acceptable. The unselectable usage names may be displayed in small letters or may be highlighted as shown in FIG. 11C.

The method for detecting the width LB of the installed label tape 141 is not limited to what has been explained with reference to FIGS. 15 and 16. For instance, the thickness of the tape cassette 143 may be detected so that the width LB of the label tape 141 is detected from that thickness. Alternatively, the width of the label tape 141 may be detected directly.

According to the second embodiment, when the "usage name" is selected, the print image of the fixed format is displayed as shown in FIG. 13B. However, a plurality of fixed formats may be prepared for each "usage name" and "content name" and those fixed formats may be displayed in accordance with the selected "content name" as shown in FIG. 5D, allowing the user to select the desired one.

Further, a plurality of fixed formats for the detected width LB of the label tape 141 may be displayed as shown in FIG. 5D without involving the selection of the "usage name" or "content name" so that the user can select the desired one.

According to the second embodiment, two types (narrow and wide) of substantially identical fixed formats with the same appearance and same contents are prepared and one of them is selected according the width LB of the label tape 141. This example is not restricted; for example, when being printed, a single fixed format may be enlarged or reduced according to the width LB of the label tape 141, allowing print data to be printed, well balanced, within the label tape 141. Furthermore, the printing width may be changed in accordance with the width LB of the label tape also in the first embodiment.

Third Embodiment

Although the fixed format is selected according to the width of the label tape 141 in the second embodiment, the present invention is not limited to this type. For instance, some frames to be combined with print data before being printed may be unprintable depending on the width of the label tape 141 in use. In this respect, only a printable frame may be selected in accordance with the width of the label tape 141.

The third embodiment which is designed to enable such selection will be described below with reference to FIGS. 17 to 22.

Figure 17:
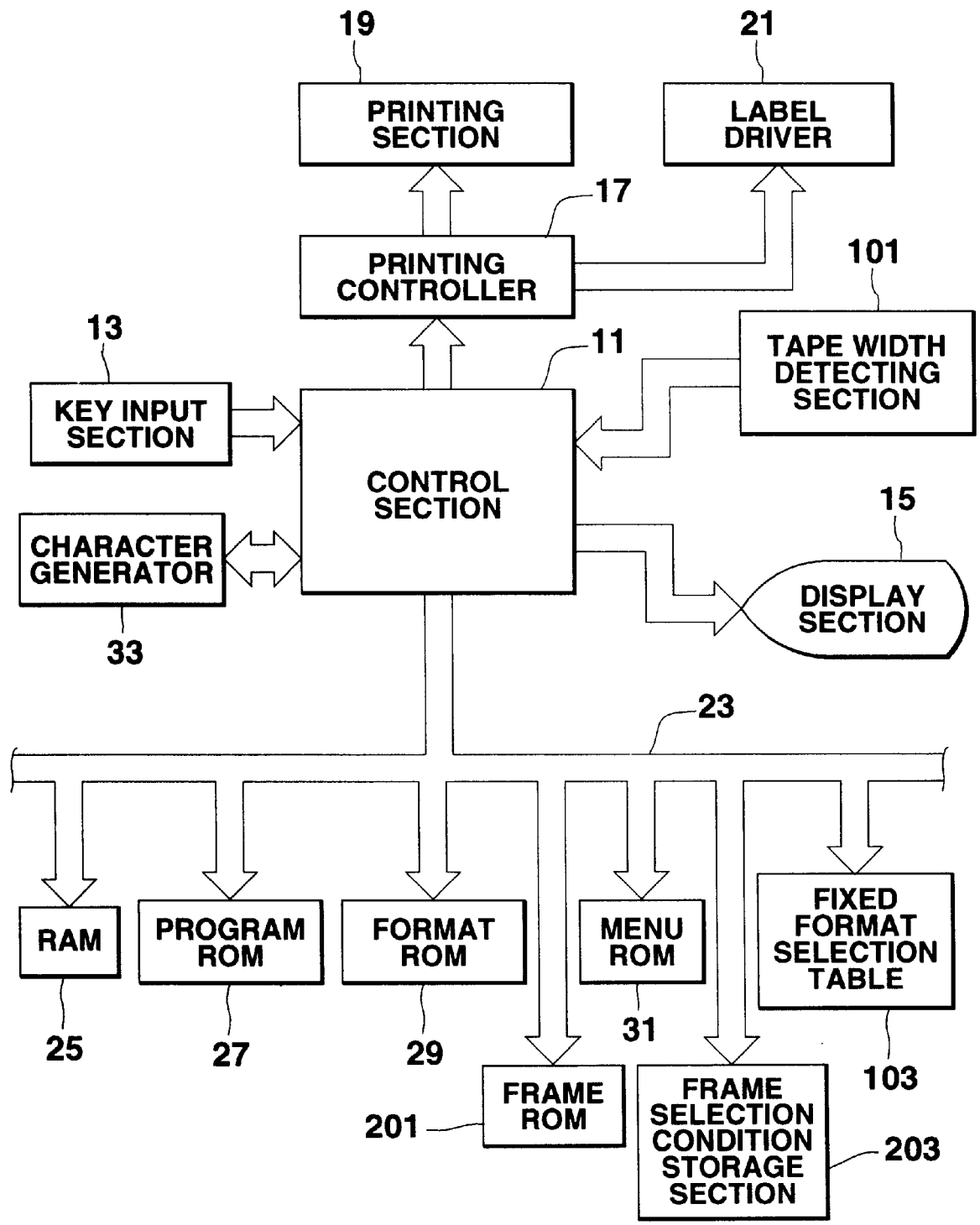
FIG. 17 is a block diagram illustrating the structure of a label printer according to a third embodiment of this invention.

FIG. 17 shows the structure of a label printer according to the third embodiment. As shown in FIG. 17, the structure of the label printer of this embodiment is substantially the same as that of the label printer of the second embodiment, but additionally has a frame storage section 201 having stored a plurality of frames and a frame selection condition storage section 203.

Figure 18:
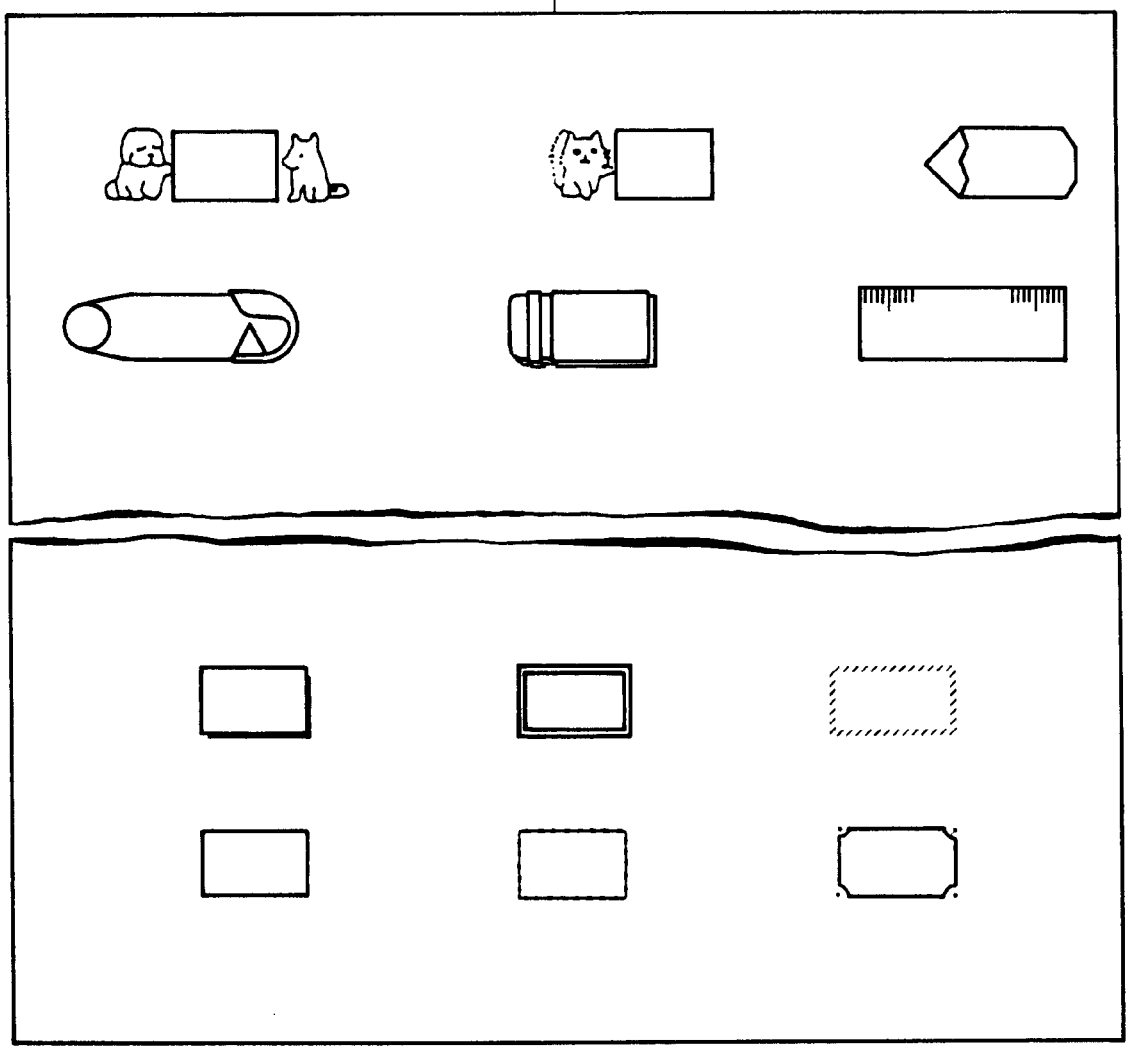
FIG. 18 is a diagram exemplifying the storage contents of a frame ROM shown in FIG. 17.

The frame storage section 201 holds a plurality of frames as shown in FIG. 18. Each frame is classified into "illustration," "ornament" or "one-character frame" (some frames may be classified into two of the groups).

For example, if a frame with a complex shape is printed on the label tape 141, the figure may be defaced to look bad due to the few dots usable in printing. According to this embodiment, therefore, the size of the frame to be combined is determined in accordance with the width LB of the label tape 141 to be printed. For example, data is printed with 128 dots across the label tape 141 which has a width of 18 mm or 24 mm, data is printed with 64 dots across the label tape 141 which has a width of 12 mm or 9 mm, and data is printed with 32 dots across the label tape 141 which has a width of 6 mm. This printing size is also stored in the frame selection condition storage section 203.

The operation of selecting and printing a frame according to this embodiment will be described below. When the user wants to add a frame to the input data, the user operates a frame key on the key input section 13.

Figure 20:
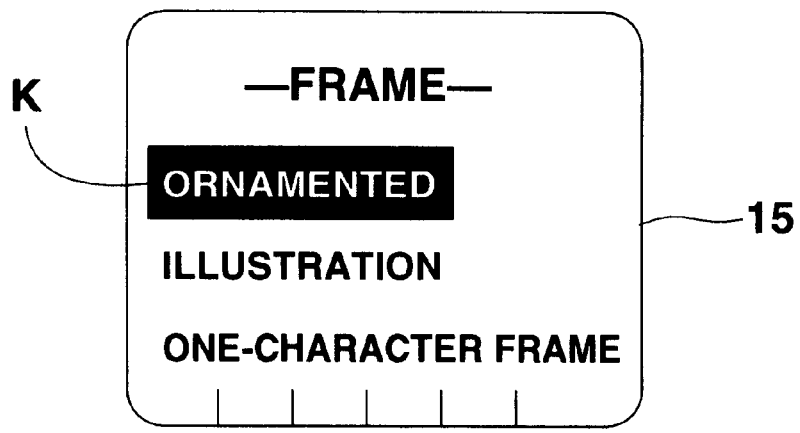
FIG. 20 is a diagram showing an example of what is displayed on the display screen of the label printer.

In response to the operation of the frame key, the control section 11 reads a type selection screen shown in FIG. 20 from the menu ROM 31 and displays it on the display section 15. The user moves the cursor and operates the execution key to select the type of the frame.

When the frame type is selected, the control section 11 displays a frame selection screen on the display section 15 to allow the user to select a frame belonging to the frame type. At this time, the control section 11 determines the width LB of the label tape 141 retained in the mounted tape cassette 143 in accordance with the signal from the tape width detecting section 101, and displays only frames printable on the label tape 141 having that width together with the cursor K, in accordance with the data stored in the frame selection condition storage section 203.

If selectable frames cannot be displayed at a time due to the limited display capacity of the display section 15, the frames are sequentially switched from one group to another in accordance with the operation of the cursor keys.

Figure 21A:
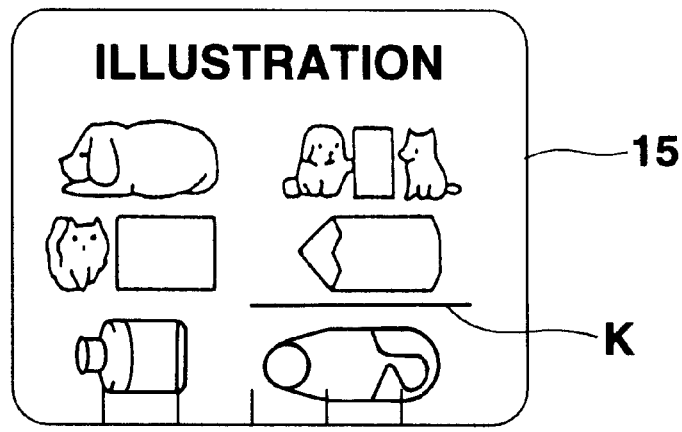
FIGS. 21A and 21B are diagrams showing examples of what is displayed on a frame selection screen.
Figure 21B:
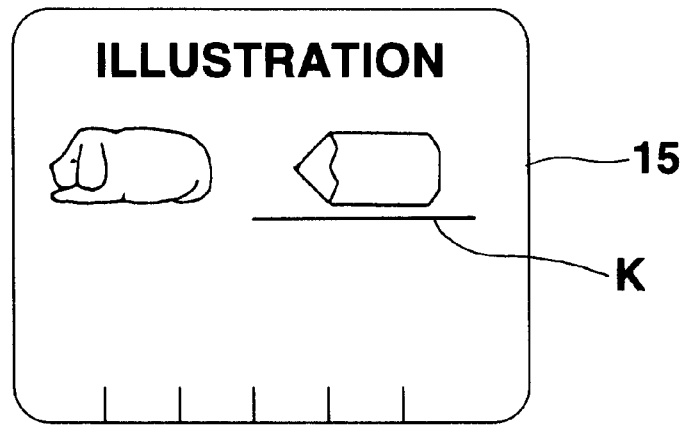

FIGS. 21A and 21B show examples of the selection screen when "illustration" is selected as the frame type. FIG. 21A shows an example of the frame selection screen when the installed label tape 141 has a width of 24 mm or 18 mm, and FIG. 21B shows an example of the frame selection screen when the installed label tape 141 has a width of 6 mm. The frame selection screen in FIG. 21A shows all the illustration types stored in the frame ROM 201, while the frame selection screen in FIG. 21B selectively shows all only the illustration types printable on the 6-mm label tape 141.

When the print key is operated, the control section 11 develops the input data in a dot pattern in the RAM 25 in accordance with the format data selected by the methods which have been explained in the section of the first and second embodiments. In accordance with the number of the frame stored in a predetermined area in the RAM 25, the control section 11 reads this frame from the frame ROM 201, combines it with the input data and develops the resultant data in the RAM 25.

Figure 22A:
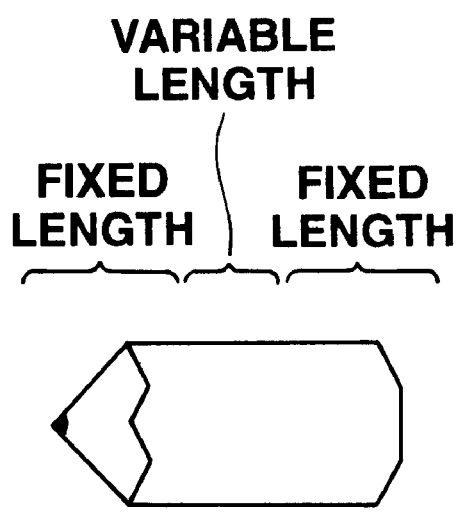
FIGS. 22A and 22B are diagrams showing the structures of individual frames.
Figure 22B:
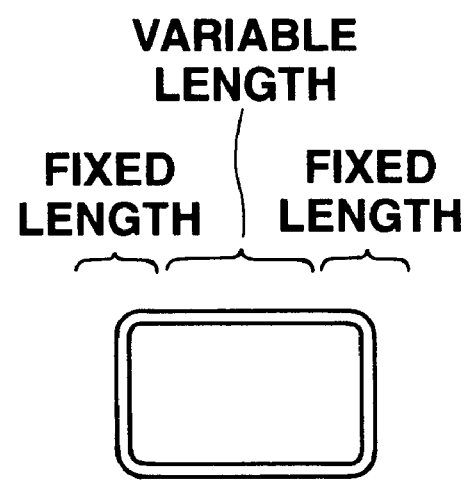

The ornamented frame and illustration frame have a fixed length portion and a variable length portion as exemplified in FIGS. 22A and 22B. The control section 11 repeatedly develops the pattern of the variable length portion to adjust the frame length in accordance with the printing length of the input data, so that the input data can lie in the frame. The printing width of the frame is set to the value selected from the values stored in the frame selection condition storage section 203 in accordance with the signal from the tape width detecting section 101.

When the development is completed, the control section 11 extracts the developed data line by line of the heat generating elements of the printing section 19, and sends the extracted data to the printer controller 17. The printer controller 17 controls the printing section 19 and the label driver 21 to print on the label tape 141 in accordance with the supplied print data.

According to the third embodiment, as described above, at the time a frame is selected, the width LB of the installed label tape 141 is checked and only the frames printable on the label tape 141 having the detected width are presented as selectable. This overcomes the aforementioned problem that the selected frame may be found unprintable, thus improving the operability of the label printer.

The present invention is not limited to the third embodiment. Although only frames printable on the installed label tape 141 are displayed in the third embodiment, all the frames may be displayed and when the user selects the frame that cannot be printed on the currently installed label tape 141, an alarm message, for example, "this frame is not selectable," is displayed. Alternatively, the selection of the frame may be accepted with the generation of an alarm message, for example, "the selected frame cannot be printed on the currently installed label tape. Please mount a tape cassette 18 mm wide or wider if you want to select this frame."

Although the frames are classified into three groups in this embodiment, the classification types are illustrative and not restrictive, and the frames should not necessarily be classified.

When the frame is selected, a print image (layout) of the frame and input data may be displayed.

At the printing stage, the width LB of the installed label tape 141 may be checked to see if the selected frame is printable on the label tape 141 for confirmation.

Although the first to third embodiments have been described with reference to the case where the present invention is adapted for a label printer, this invention is in no way limited to the label printer. For example, this invention is applicable to an ordinary word processor, a personal computer and the like. Further, the this invention is adapted not only for a printing apparatus equipped with a printing section, but also for an apparatus which is equipped with no printing section and generates only print pattern data (i.e., printing is executed by another apparatus). The output mode is not limited to a printout, but output data may be displayed instead.

In short, according to this invention, the user can easily print data in an elaborate form, without setting a complex form, simply by selecting the proper fixed format from among previously set fixed formats and inputting necessary character data.

Since only the fixed format or frame matching with the size of a printing medium in use is selected according to the present invention, unusable fixed formats or frames are not selected, so that the proper fixed format and frame can be selected easily and surely.

What is claimed is:

1. A label printer comprising:
   a printer body in which any particular one of a plurality of types of tape cassettes each containing a label tape of a different width is settable;
   tape width detecting means for detecting the type of the particular tape cassette set in said printer body, and for thereby detecting the width of the label tape contained in the particular tape cassette;
   fixed format data storage means for storing a plurality of fixed format data respectively corresponding to the widths of the label tapes of the plurality of types of tape cassettes and a plurality of different usages of the label tapes;
   display means for displaying a list of a plurality of usage names representing the plurality of different usages;
   designation means for designating an arbitrary one of the plurality of displayed usage names;
   selecting means for selecting, from said fixed format data storage means, fixed format data corresponding to the width of the label tape detected by said tape width detecting means and the usage name designated by said designation means;
   input means for inputting print data to be printed to the printer; and
   printing means for printing said print data, input by said input means, on the label tape of the particular tape cassette set in the printer body, in accordance with a format based on said fixed format data selected by said selecting means.

2. The label printer according to claim 1, further comprising detailed usage name display means for displaying a list of a plurality of detailed usage names belonging to the usage name selected by said selecting means.

3. The label printer according to claim 1, wherein:

said display means comprises detailed usage name display means, responsive to the usage name being designated by said designation means, for displaying a list of a plurality of detailed usage names representing detailed usages belonging to the usage represented by the designated usage name; and said designation means comprises means for designating any detailed usage name from among the plurality of detailed usage names displayed by said detailed usage name display means.

4. The label printer according to claim 1, wherein said display means comprises:

a display section having a display screen;

display screen data storage means for storing display screen data to display the plurality of usage names; and display control means, responsive to the display screen data, for displaying the plurality of usage names in a distinctive manner on the display screen of said display section in a manner which indicates whether each usage is usable or unusable with respect to the label tape of the cassette set in the printer body.

5. The label printer according to claim 1, wherein the plurality of usage names each represent a name of an object on which the label tape on which the print data is printed by said printing means is pasted.

6. The label printer according to claim 1, wherein the plurality of fixed format data are classified into a plurality of groups which each correspond to a respective one of the plurality of different usages, and the plurality of different usages are classified into a plurality of groups which each correspond to a respective one of the widths the label tapes of the plurality of types of tape cassettes.

7. A label printer comprising:

input means for inputting print data to be printed on a label tape contained in a tape cassette set on a printer body;

fixed format data storage means for storing a plurality of fixed format data corresponding to a plurality of different usages and a plurality of groups of detailed usages, each group of detailed usages belonging to a respective one of the plurality of usages, and the plurality of fixed format data each being used to print the print data input by said input means on the label tape;

full image storage means for storing data on full images of a plurality of fixed formats corresponding to said plurality of fixed format data stored in said fixed format data storage means;

first list display means for displaying a list of usage names representing respective names of the plurality of usages;

first designating means for designating one of the usage names displayed by said first list display means;

second list display means for displaying a list of a plurality of detailed usage names representing detailed usages belonging to a use which is represented by the usage name designated by said first designating means;

full image display means, responsive to said plurality of detailed usage names being displayed in the list by said second list display means, for reading the full image data from said full image storage means which corresponds to the displayed plurality of detailed usage names, and for displaying the read full image data;

second designating means for designating one of the plurality of detailed usage names in the list displayed by said second list display means;

selecting means for selecting from said fixed format data storage means the fixed format data which corresponds to the detailed usage name designated by said second designating means; and printing means for printing said print data, input by said input means, on the label tape of the tape cassette set in the printer body, in accordance with fixed format data selected by said selecting means.

8. The label printer according to claim 7, wherein:

said first list display means comprises a display section having a display screen, first display screen data storage means for storing first display screen data for displaying the list of usage names, and first display/control means for displaying the first display screen data on the display section; and said second list display means comprises second display screen data storage means which contains second display screen data for displaying the list of detailed usage names, and second display/control means for displaying the second display screen data on the display screen.

9. The label printer according to claim 7, wherein the plurality of usage and detailed usage names represent a name of an object on which the label tape on which the print data is printed by said printing means is pasted.

10. The label printer according to claim 7, wherein the plurality of fixed format data are classified into a plurality of groups which each correspond to a respective one of the plurality of different usages, and the plurality of different usages are classified into a plurality of groups which each correspond to a respective width of the label tape contained in the tape cassette.

* * * * *

UNITED STATES PATENT AND TRADEMARK OFFICE
CERTIFICATE OF CORRECTION

PATENT NO. : 5,933,589
DATED : August 3, 1999
INVENTOR(S) : Norihiro HIDAKA et al.

It is certified that error appears in the above-identified patent and that said Letters Patent is hereby corrected as shown below:

On title page,
Item [56] References Cited, under "U.S. PATENT DOCUMENTS", change "5,684,070" to --5,684,970--.

Signed and Sealed this

Eighth Day of August, 2000

Attest:

Q. TODD DICKINSON

*Attesting Officer*  *Director of Patents and Trademarks*